(12) United States Patent
McQuaide, Jr. et al.

(10) Patent No.: US 8,180,704 B2
(45) Date of Patent: May 15, 2012

(54) LOST CREDIT CARD NOTIFICATION SYSTEM AND METHOD

(75) Inventors: Arnold Chester McQuaide, Jr., Berkeley Lake, GA (US); Linda A. Roberts, Decatur, GA (US); Robert A. Koch, Norcross, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1833 days.

(21) Appl. No.: 10/150,807

(22) Filed: May 17, 2002

(65) Prior Publication Data

US 2003/0217001 A1 Nov. 20, 2003

(51) Int. Cl.
*G06Q 40/00* (2006.01)
(52) U.S. Cl. .................................................. 705/39
(58) Field of Classification Search ............... 705/39–42
See application file for complete search history.

(56) References Cited

U.S. PATENT DOCUMENTS

| | | | | |
|---|---|---|---|---|
| 4,650,219 A * | 3/1987 | Sigman | ............................ | 283/70 |
| 6,882,706 B2 * | 4/2005 | Andrew | ............................ | 379/45 |
| 7,096,003 B2 * | 8/2006 | Joao et al. | ...................... | 455/406 |
| 7,747,522 B1 * | 6/2010 | Walker et al. | ................... | 705/39 |
| 2001/0044787 A1 * | 11/2001 | Shwartz et al. | ................. | 705/78 |
| 2003/0061167 A1 * | 3/2003 | Mann et al. | ..................... | 705/64 |

* cited by examiner

Primary Examiner — Hani M Kazimi

(74) Attorney, Agent, or Firm — Scott P. Zimmerman PLLC

(57) ABSTRACT

A system and method for notifying one or more credit card companies of lost or stolen credit cards relatively automatically upon noticing that the one or more credit cards are missing. A user profile is created and stored on a server computer system, wherein the user profile has user verification information, credit card account information and credit card company contact information, typically for each credit card owned by a particular user. Using the user profile, the server computer system receives a request to cancel one or more of the owner's credit cards. The server computer system then communicates with each individual credit card company, relatively automatically, to notify of the loss. The communication may involve the request to cancel the credit card (s), as well as a request for a replacement credit card. Additionally, the owner may be notified by the server computer system that the request(s) have been made and/or by the credit card companies of the received request(s) and respective account status.

15 Claims, 8 Drawing Sheets

| | User ID | Password | Contact Information | CC 1 Information | CC 2 Information | CC 3 Information | ... |
|---|---|---|---|---|---|---|---|
| 402 | Smith1 | shark | 555.123.1234 | Visa 555.222.7865 CC# 12341234 | Visa 555.222.7865 CC# 12777734 | | |
| 404 | Jones2 | Jackson | 555.123.1235 | Master Card 555.333.7554 CC# 12356564 | Visa 555.222.7865 CC# 12341234 | | |
| 406 | Doe1 | xxxxx | 555.123.1236 | Discover 555.555.7554 CC# 12356564 | Master Card 555.333.7554 CC# 12356564 | | |
| 408 | Tuckr2 | systems | Mar@xx.com | Visa 555.222.7865 CC# 12356564 | Discover 555.555.7554 CC# 12356564 | Master Card 555.333.7554 CC# 12356564 | |
| 410 | Austin3 | ryno | 555.123.1111 dx@yy.com | Master Card 555.333.7554 CC# 12356564 | | | |

Column labels: 412, 414, 416, 418, 420, 422 (table 400)

Fig. 4

LOST CREDIT CARD NOTIFICATION SYSTEM AND METHOD

FIELD OF THE INVENTION

This invention relates to the field of automated systems, and in particular, automated notification systems. More particularly still, the present invention relates to communication systems used to notify credit card companies of lost credit cards.

BACKGROUND OF THE INVENTION

Losing a credit card can be a harrowing experience. Losing several credit cards is worse. Having a wallet full of many credit cards stolen is a nightmare. Once one or more credit cards are lost or stolen, the owner of the cards must begin the process of notifying the credit card companies in order to cancel the various accounts. In the case of a theft, the credit-card owner is typically in a race against time to prevent fraudulent purchases from being charged against the stolen credit cards. Consequently, the owner must not only notify the credit company of the loss but must do so as soon as possible.

Typically, in order to notify a credit card company of a lost or stolen credit card and to therefore cancel or freeze the corresponding account to prevent potential fraudulent purchases, the owner must call the credit card company directly. Upon calling, the process entails the owner satisfying numerous identity and account verifications, which can be difficult, especially if the owner does not know the credit card account number. For example, upon calling the credit card company, the owner may have to recite some or all of the owner's social security number, address, zip code, mother's maiden name, etc. in order to satisfy the identification requirement. Assuming the owner is able to remember the necessary information, which may be difficult for some people, the owner then requests cancellation of the lost card and typically a replacement card, i.e., a new account number with the previous account transferred to the new account.

Unfortunately however, this notification process suffers some significant drawbacks. For instance, most credit card owners have not memorized the phone numbers for their credit card companies and must therefore search for the numbers. This information is typically located on the credit cards themselves, which is worthless once the cards are lost or stolen. The contact information may also be located in the person's home, which is only helpful if (a) the owner is at home and (b) the owner remembers the location of the information. Regrettably, the owner is often on vacation or otherwise far from their home when the card or cards are discovered missing. Consequently, the owner has a difficult task of rushing home, finding the information for all the different cards, and then making the proper phone calls.

Moreover, once the calls are placed, the credit card companies typically take a significant amount of time in handling the matter, placing the owner on hold or making them select many different options from the automated telephone systems. These time delays are more than an inconvenience as a thief may be charging against the account during this time.

It is with respect to these and other considerations that the present invention has been made.

SUMMARY OF THE INVENTION

The present invention relates to a system and method for notifying one or more credit card companies of lost or stolen credit cards relatively automatically upon noticing that the one or more credit cards are missing. The invention entails the creation of a user profile on a server computer system, wherein the user profile has user verification information, credit card account information and credit card company contact information, typically for each credit card owned by a particular user. Using the user profile, the owner is able to contact the server computer system and request cancellation of one or more credit cards. According to aspects of the present invention, the server computer system then communicates with each individual credit card company, relatively automatically, to notify of the loss. The communication may involve the request to cancel the credit card(s), as well as a request for a replacement credit card. Additionally, the owner may be notified by the server computer system that the request(s) have been made and/or by the credit card companies of the received request(s) and respective account status.

The invention may be implemented as a computer process, a computing system or as an article of manufacture, such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its improvements can be obtained by reference to the accompanying drawings, which are briefly summarized below, to the following detailed description of presently preferred embodiments of the invention and to the appended claims.

BRIEF DESCRIPTION OF THE DRAWINGS

FIG. 4 is a representation of a profile database having a plurality of different profiles according to aspects of the present invention.

DETAILED DESCRIPTION OF THE INVENTION

Figure 1:
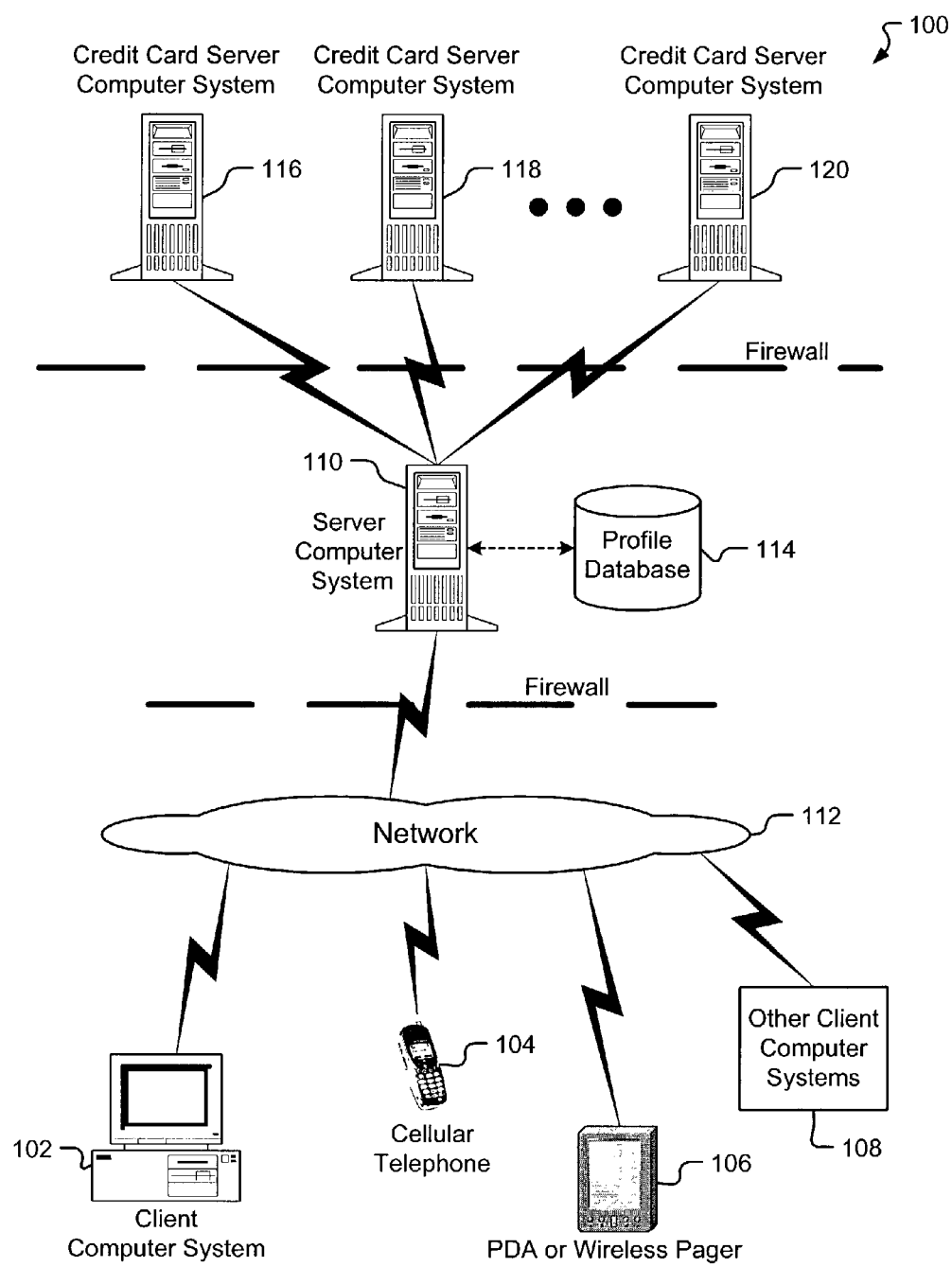
FIG. 1 illustrates a distributed network system that incorporates aspects of the present invention.

A distributed environment 100 incorporating aspects of the present invention is shown in FIG. 1. The environment 100 relates to a distributed network having at least one client computer system, such as client computer systems 102, 104, 106 and/or 108 that communicates with at least one server computer system 110. The client computer systems 102, 104, 106 and 108, communicate with the server computer system 110 using a communication protocol over the distributed network 112, such as over the Internet. The server computer system 110 maintains a database 114 of user profiles, wherein each profile has a user identifier and at least one credit card identification number or alias. Besides communicating with the client systems 102, 104, 106 and 108, the server computer system 110 also communicates with at least one company or credit card server computer system, such as systems 116, 118 and 120. Each credit card server computer system 116, 118 and 120 maintains and manages credit card account information for credit card users. Additionally, each credit card server computer system 116, 118 and 120, in an embodiment, cancels or freezes credit card accounts when notified of a loss and, in some embodiments, notifies the user of the cancellation.

In an embodiment, a credit card owner uses one of the client computer systems, such as 102, 104, 106 or 108 to create a user profile to be stored in database 114. The user profile has user verification information, credit card account information and credit card company contact information. Also, the profile typically has information for each credit card owned by that particular user. The profile is then transmitted via the network 112 to the server computer system 110 and stored in the profile database 114. In a particular embodiment, the user may use a personal computer system 102 operating a browser software module to communicate with the server computer system 110 to set up the user profile. The communication session may involve multiple transfers of information back and forth between the browser module and the server, in order to ensure the proper information is stored in the proper database. Additionally, the communication may take place along a secure link to reduce the risk of theft.

Once the profile has been established, the user may then request cancellation of one or more credit cards from numerous different client systems, such as 102, 104, 106 or 108. Using one of the client systems 102, 104, 106 and/or 108, a credit card owner transmits a request to the server computer system 110 directing the server computer system to cancel one or more credit cards. The request may include identification information such that the server 110 can verify the identity of the user. Alternatively, the server computer system 110 can request identification information in response to a request to cancel the credit cards. In one embodiment, the communication between the server 110 and the client computer system or systems 102, 104, 106 and 108 occurs through a firewall as shown in FIG. 1.

Many different client systems and corresponding network connections may be used to communicate the identification information and the request to cancel the credit cards. For instance, the user may use a personal computer, such as 102 to communicate with the server computer system 110 across the Internet 112. The communication may involve a Hypertext Transfer Protocol (HTTP) request for a secure website, providing a login name and password using Hypertext Markup Language (HTML) or another markup language. In another embodiment, the client computer system may be a cellular telephone system 104 executing an application designed to communicate with the server 110. The application may be a Wireless Application Protocol (WAP) module providing Wireless Markup Language (WML) requests to the server 110 through a switching center or wireless gateway to the Internet 112. The WAP module may be voice activated, receiving voice signals that are converted to digital signals by the system 104 or it may receive button presses as input signals.

Similarly, the client computer system may also be a PDA or other wireless device, such as a pager 106. These devices may also communicate with the server 110 using HTML or WML requests and may further provide user interface selection options. Yet other client computer systems 108 may be used to communicate cancellation requests to the server computer system. Such other client computer systems may include, for example, wireline or wireless telephone systems communicating through a voice gateway that converts voice signals to digital requests, e.g., by using voice XML. The digital requests may then be interpreted by the server as a request to cancel one or more credit cards.

In response to a received request, the server 110 may verify the identity of the requesting party, access the user's profile from the profile database 114 and return a list of credit cards to the user. The user may then select those credit cards that are to be canceled. The server computer system 110 reacts to the selection by notifying each credit card server computer system, such as systems 116, 118 and 120 necessary to cancel the selected credit cards. In one embodiment, the credit card company contact information is stored with the profile. Other embodiments involve a lookup table of known credit card server computer system contact information. Entries in each user profile correspond to entries in the lookup table such that the server is able to locate the necessary contact information for the desired credit card company.

Each credit card server, such as server systems 116, 118 and 120, receives requests from the server computer system requesting that one or more credit card accounts be frozen or canceled due to loss. The credit card servers may employ a security measure to ensure the server computer system 110 has proper authorization to cancel the requested accounts. Once authorized, the credit card accounts are then frozen and canceled. The servers 116, 118 and 120 may further provide notifications to the user relating to the status of the accounts either directly or through the server 110.

Figure 2:
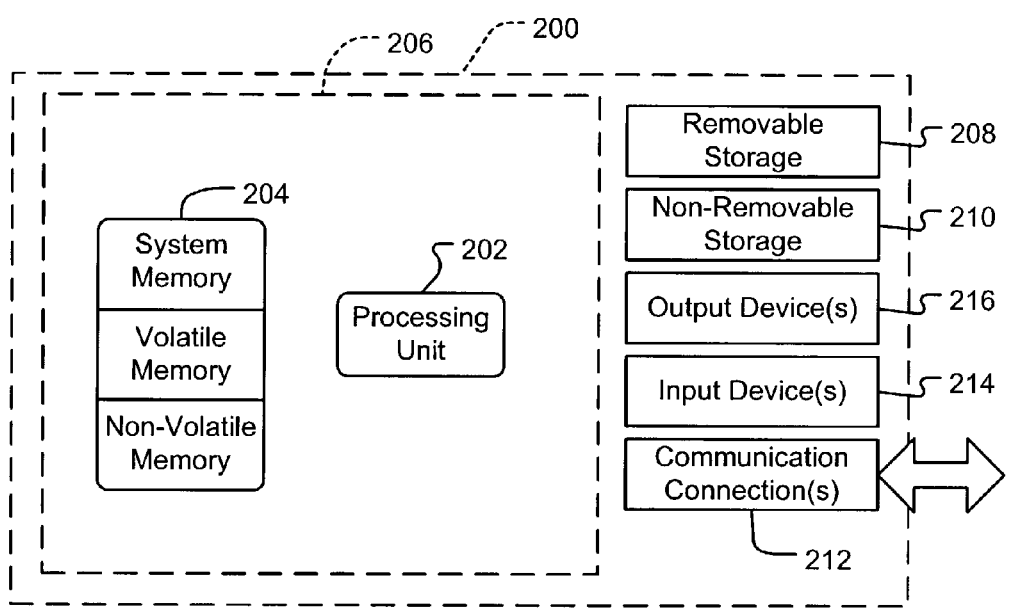
FIG. 2 illustrates a computer system that may be used according to particular aspects of the present invention.

The computer systems, such as systems 102, 104, 106, 110, 116, 118 and 120 may each be represented by the computer system 200 shown in FIG. 2. That is, the basic functional components of each of the different computer systems 102, 104, 106, 110, 116, 118 and 120 may be represented by system 200. The system 200 has at least one processor 202 and a memory 204. In its most basic configuration, computing system 200 is illustrated in FIG. 2 by dashed line 206 encompassing the processor 202 and the memory 204. Additionally, system 200 may also include additional storage (removable and/or non-removable) including, but not limited to, magnetic or optical disks or tape. Such additional storage is illustrated in FIG. 2 by removable storage 208 and non-removable storage 210. Computer storage media, such as memory 204, removable storage 208 or non-removable storage 210 includes volatile and nonvolatile, removable and non-removable media implemented in any method or technology for storage of information such as computer readable instructions, data structures, program modules or other data. Memory 204, removable storage 208 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by system 200. Any such computer storage media may be part of system 200. Depending on the configuration and type of computing device, memory 204 may be volatile, non-volatile or some combination of the two.

System 200 may also contain communications connection(s) 212 that allow the device to communicate with other devices. Additionally, system 200 may have input device(s) 214 such as keyboard, mouse, pen, voice input device, touch input device, etc. Output device(s) 216 such as a display, speakers, printer, etc. may also be included. All these devices are well known in the art and need not be discussed at length here.

Computer system 200 typically includes at least some form of computer readable media. Computer readable media can be any available media that can be accessed by system 200. By way of example, and not limitation, computer readable media may comprise computer storage media and communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

Figure 3:
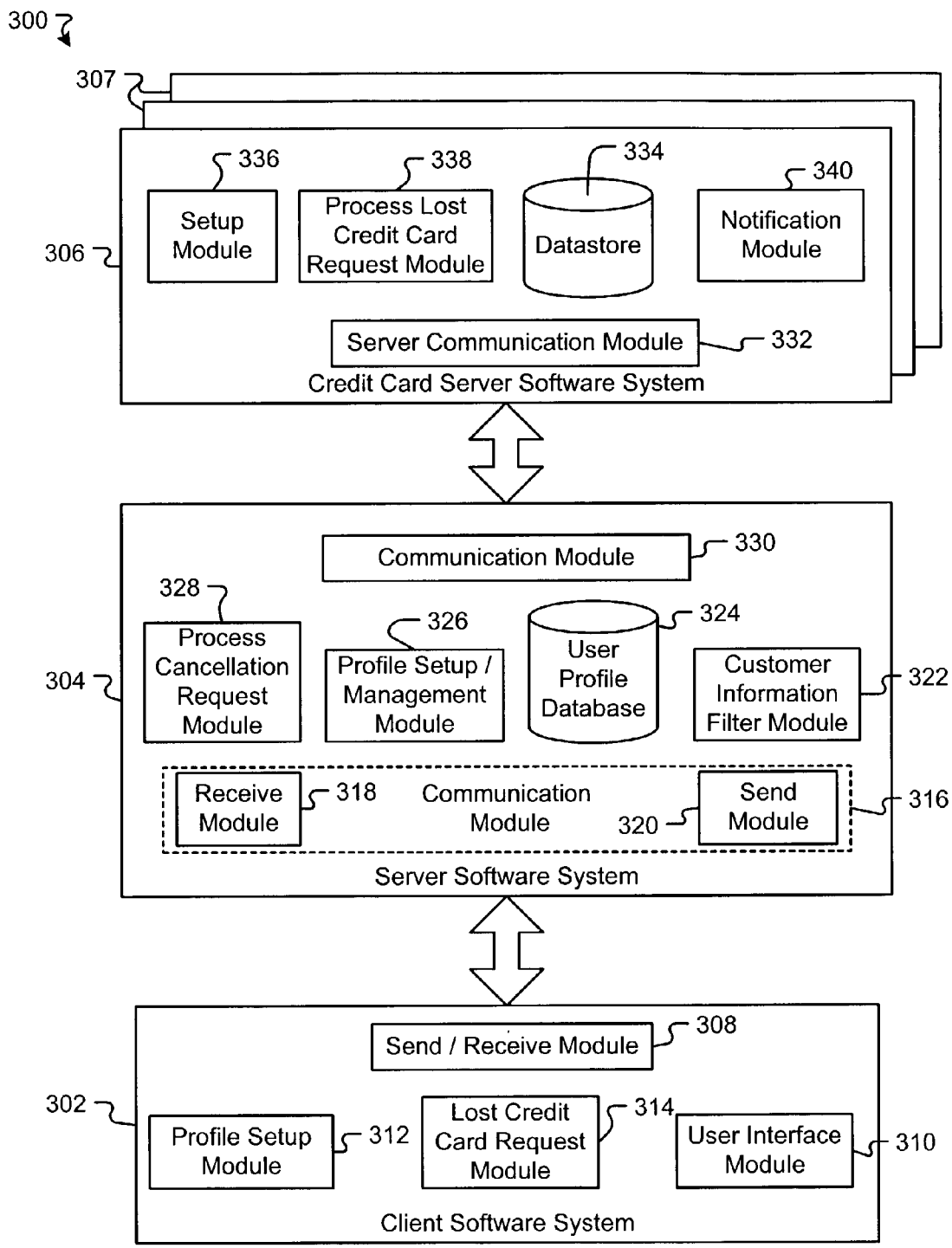
FIG. 3 is a block diagram illustrating functional components of the system shown in FIG. 1 incorporating aspects of the present invention.

FIG. 3 illustrates a software/hardware environment 300 incorporating aspects of the present invention. The environment 300 includes separate modules that perform functional operations in accordance with those aspects. The functional operations of the various embodiments of the present invention are implemented (1) as a sequence of computer implemented steps running on a computing system and/or (2) as interconnected machine modules within the computing system. The implementation is a matter of choice dependent on the performance requirements of the computing system implementing the invention. Accordingly, the logical operations making up the embodiments of the present invention described herein are referred to alternatively as operations, steps or modules.

In general, the environment 300 comprises a client computer system or layer of software 302, a server computer system or layer of software 304, and at least one credit card server software system 306. The layers 302, 304 and 306, in one embodiment, correspond respectively to a client computer system, such as client computer systems 102, 104, 106 and 108 (FIG. 1), a server computer system, such as server computer system 110 (FIG. 1) and one credit card server system, such as one of the credit card server systems 116, 118 and 120 (FIG. 1). The client layer 302 communicates with the server layer 304 in order to access a secure link and to allow the user of the client system 302 to set up a user profile, and in other embodiments, to request notification and/or cancellation of lost credit cards. The server layer 304 communicates with the credit card server layer 306, and possibly other credit card server layers 307, to process cancellation requests to cancel or freeze credit card accounts, as discussed below.

To access the secure link, the client layer 302 has a send/receive module 308 that is used to communicate with the server layer 304. In an embodiment, the send/receive module 308 is a browser module used to send requests and receive documents or other information over the Internet. In another embodiment, the send/receive module is a WAP application on a wireless device, such as cell phone that may also communicate information over the Internet. The client layer 304 may further include a user interface module 310 that is used to interface with the user to provide results back to the user and receive search requests from the user. In an embodiment, the send/receive module 308 may download other functional modules to the client layer 302 that provide some functionality on the client layer during the process of accessing the secure link.

Besides the send/receive module 308 and user interface module 310, the client system 302 might include other functional modules, such as a profile setup module 312 and/or a lost credit card request module 314. The profile setup module relates to the functional code and user interface elements used in communicating with the server layer to create a profile or modify an existing profile. Other embodiments do not include specific profile setup modules on the client software system 302 unless or until the client requests that a profile be made or modified. In these embodiments the server layer 304 may download the necessary module 312 or simply request and receive information from the client system 302.

Similarly, the lost credit card request module 314 may not be constantly present on the client software system 302 unless or until the client requests notification and/or cancellation of one or more lost credit cards. In operation, the client connects to the server layer 304 and is provided a plurality of choices, including profile management and lost credit card request options. In such a case, the server layer 304 may download the necessary module 312 or 314 or simply ask and receive information from the client system 302. As may be appreciated, the client layer 302 may include many other modules, such as input and output control modules, used in the course of processing and computing other functions. Such other modules are well known in the art and need not be discussed in detail here. Although client layer modules, such as modules 312 and 314 may provide functional capabilities on the client layer 302, other embodiments do not include such modules. In those embodiments, the client layer 302 primarily packages and sends requests to the server layer 304, such that the bulk of the computing is performed on the server 304 or in the platform layer 306, and receives and displays the results.

With respect to the server layer 304, it has a communication module 316 that communicates with the client layer 302. The communication module 316 may include a server receive module 318 for receiving communication requests from the client layer 302, e.g., the send/receive module 308. The communication module 312 may further include a send module 320 designed to package and send search results back to the client layer 302, and in particular, to the module 308.

The server software system 304 incorporates a customer information filter module 322, which is used to evaluate customer information received from the client computer layer 302. In most embodiments, the customer information filter module 322 does not process requests until an actual request to cancel credit cards is made, but other embodiments may require information to begin the profile setup routine. The evaluation process is to validate that the client system user has an existing account/profile or, in some embodiments, desires to create a profile. The customer information, in an embodiment, relates to a login name and a password. In other embodiments, the customer information may be any other identification information that may be verified by the server layer 302, and in particular the customer information filter module 322. The verification process performed by the customer information filter module 322 may involve the parsing of an access request to glean the customer information. Upon determining the customer information, the customer information filter module 322 may access a specific verification table or database (not shown) or portions of a user profile database 324 to determine if the information is valid. Alternatively, the verification database, and potentially the verification module, may reside on the credit card system layer 306.

The server layer 304 includes a user profile database 324. The user profile database 324 represents the profile database 114 described above in conjunction with FIG. 1. The user profile database 324 stores profiles for registered users, wherein each user profile has specific information relating to user credit card account information. In particular, each profile stores user identification information associating a particular user with the profile and credit card account identification information for at least one credit card. In other embodiments, each profile further includes a security element, such as a password value that provides a level of security such that the user's profile is accessible only by those knowing the password value. The profiles may further include other information, such as user contact information, e.g., a phone number or list of phone numbers, an address, an email account, etc. which allows the server 304 and or credit card layer 306 to contact the user for verification and/or notification purposes. The profiles may also include credit card contact information and/or other credit card account information. Sample profiles are discussed in more detail below in conjunction with FIG. 4.

The client layer 304 has a profile setup/management module that provides the functionality associated with setting up a new profile and editing or managing an existing profile. To set up a new profile, a client may request a new account, and provide any necessary information to set up a new account, such as payment information and/or identification information. Upon receiving the necessary information, setup module 326 dedicates a new record in the database 324 to the new profile and a user identification value (ID) and possibly a password are associated with the record. The setup module 326 also requests any other necessary information, such as contact information and credit card account information. Besides a credit card account number or alias, the setup module may request credit card company contact information as well, in order to ensure that the credit card company can be contacted in case a loss is reported.

During modification or management of an existing profile, the module 326 may initially access the existing profile and display the information for the user. Upon displaying the information, the user may request modification of existing information or the addition of new information, such as new credit card account information. When adding new account information, the module 326 may request contact information for the credit card company as discussed above.

Besides the setup/management module 326, the server layer 304 may further include a cancellation module 328. The cancellation module 328 provides the functionality for parsing a request to cancel one or more credit cards and communicating such a request to the one or more credit card server software layers, such as layer 306 shown in FIG. 3. The cancellation module 328 may communicate with the client, through the communication layer 316, to verify that the user has permission to cancel the credit cards. Further, the cancellation module 328 may verify whether all or some of the credit cards should be canceled. The user of client system 302 may provide this information, if requested. Upon validation of the customer information and upon receipt of the request to cancel the credit card(s), the cancellation module 328 communicates with the credit card server layer 306 to notify the system 306 of the lost credit card.

In order to communicate with the credit card server layer 306, the server software system 304 has a communication module 330. The communication module typically connects with the credit card system 306 to establish a secure link. In addition, the layer 306 has a server communication module 332 to enable this communication. The modules 330 and 332 may communicate across a firewall, and may use one of a number of different known protocols to achieve this communication.

In an embodiment, the credit card server system 306 has a datastore 334 that stores the credit card account information for the various credit card holders. The credit card company that issued the credit card or cards to the users manages this information. In essence, the credit card server software system is part of, or is a directly connected or associated with the credit card company that has issued at least one card to one of the users having a profile on the database 324, such that a matching account entry is located in the database 334. As an example, the credit card server system 306 may be owned or managed by Visa® credit card company, MasterCard® credit card company, or American Express® credit card company, etc. In such a case, other credit card servers 307 are implemented by other credit card companies to manage their users' accounts. Consequently, the datastore 334 may contain account information for issued credit cards by that company. One difference between datastore 334 and database 324 is that the profile database 324 may have many user profiles each having credit card information that may be independent of the various companies, e.g., one profile may be associated with a credit card holder having only a Visa® credit card while another profile may be associated with card holder having both an American Express® credit card and a MasterCard® credit card. On the other hand, the datastore 334 typically only has accounts for a particular company, e.g., Visa® credit card company.

Additionally, the server layer 306 has a process lost card credit card request module 338. Upon receiving notification from the server layer 304 of a lost or stolen credit card, process module 338 processes any associated requests or procedures for handling the lost credit card situation. For instance, the module 338 may verify that the server is providing the correct user information for the account number. The module 338 may also verify the account is listed in the datastore 334. The module 338, upon identifying the account as valid and active, freezes or cancels the account such that no more purchases may be made against this account. The process module 338 may also alert other credit card server modules that the account has been frozen or canceled to effectively provide other functions.

As an example, the process module 338 may alert a notification module 340 of the account being frozen or canceled. In turn, the notification module 340 may notify the account owner that such action has been taken. In doing so, the notification module may look up contact information, such as a phone number, email address or post office address and using this information automatically and directly notify the owner. Alternatively, the notification module 340 may simply notify the server layer 304 that the action has been completed and the server layer can look up any contact information and notify the owner.

FIG. 4 is a representation of a profile database 400 having a plurality of different profiles 402, 404, 406, 408 and 410 according to aspects of the present invention. In the embodiment shown in FIG. 4, each user profile, such as profiles 402, 404, 406, 408 and 410, has a user identification value 412, a password 414, some contact information 416 and at least one entry related to a credit card account 418. Other profiles, such as profiles 402, 404, 406 and 408 have an entry related to a second credit card account 420. Profile 408 has yet another entry 422 related to a third credit card account. In essence, practically any number of credit card accounts may be identified for a particular user profile. Other embodiments may not include the contact information 416 or the password value 414 since all that is really needed to establish a profile is a user identification and at least one credit card number or alias, as discussed below.

The user identification value 412 typically relates to the user's actual name or login name. Other embodiments may use any value in column 412 as an identification value, as long as the server may verify the value against requested user credentials. For instance, the server may request a user login name and password from the client. Once provided, the server may use a lookup table to access the associated profile. In an embodiment, the user name and password are part of the profile, as shown in FIG. 4.

The contact information 416 may be provided by the user during the setup of the profile and typically relates to contact information that is independent of the communication link, e.g., the Internet link, used to access the server when requesting the notification of lost credit cards. The independent information may be a telephone number, email address or post office address. That is, the server may contact the client system by simply responding during an Internet communication session. However, the contact information 416 provides an independent method of contacting the owner of the credit cards. Such contact may be made once one or more cards have been frozen or cancelled. Indeed, in one embodiment, the credit card accounts are merely frozen until independent contact has been made and the owner has acquiesced in the cancellation of the cards. Also the contact may be made by the server such as server 110 (FIG. 1) or the credit card server 116 (FIG. 1).

Each profile 402, 404, 406, 408 and 410 has information 418 related to at least one credit card account. The information may include a credit card company and contact information for that credit card company. The contact information may be the network address for the credit card server or some other information that is used by the server to contact the proper credit card server and begin communication. Additionally, the information 418 also includes an account number or alias. The alias may be specialized code recognizable by the credit card company only as related to a specific account number. Such an alias system prevents the storage of live account numbers on a system that may not be as secure as the credit card server. Since the alias is only used in freezing or canceling an account, most users are less concerned as to whether the information is secure. If an alias is used, the profile setup routine must communicate with either the credit card server to determine the proper alias or the user must independently determine this information and store the information in the profile.

As shown in FIG. 4, a single profile may contain two or more credit card account information entries. Additionally, a profile, such as profile 402, may have two entries relating to the same credit card company. Alternatively, a profile, such as profiles 404, 406, 408 and 410 may have entries related to different credit card companies. Using these different entries, the client can request that the server automatically contact all the companies having entries in the client's profile to notify the companies of the loss. In other embodiments, other information may be stored in each user's profile. For example, one embodiment may have driver's license information, including contact information to begin the process of issuing a new license. Additionally, other account information may be stored in a profile, such as health club membership account information, employment identification information, e.g., an ID card, among others. Preferably, each account entry includes enough information to allow the server to automatically contact the proper company or its server system to notify that company of a loss, but such information is not necessary. Upon receiving notification of a loss, each server may implement functions to handle the loss notification. As an example, the servers may begin the cancellation process, may begin issuing new account information or new ID cards. Preferably, the process includes contacting or notifying the owner of the frozen or canceled account, but such contact is not necessary.

Figure 5:
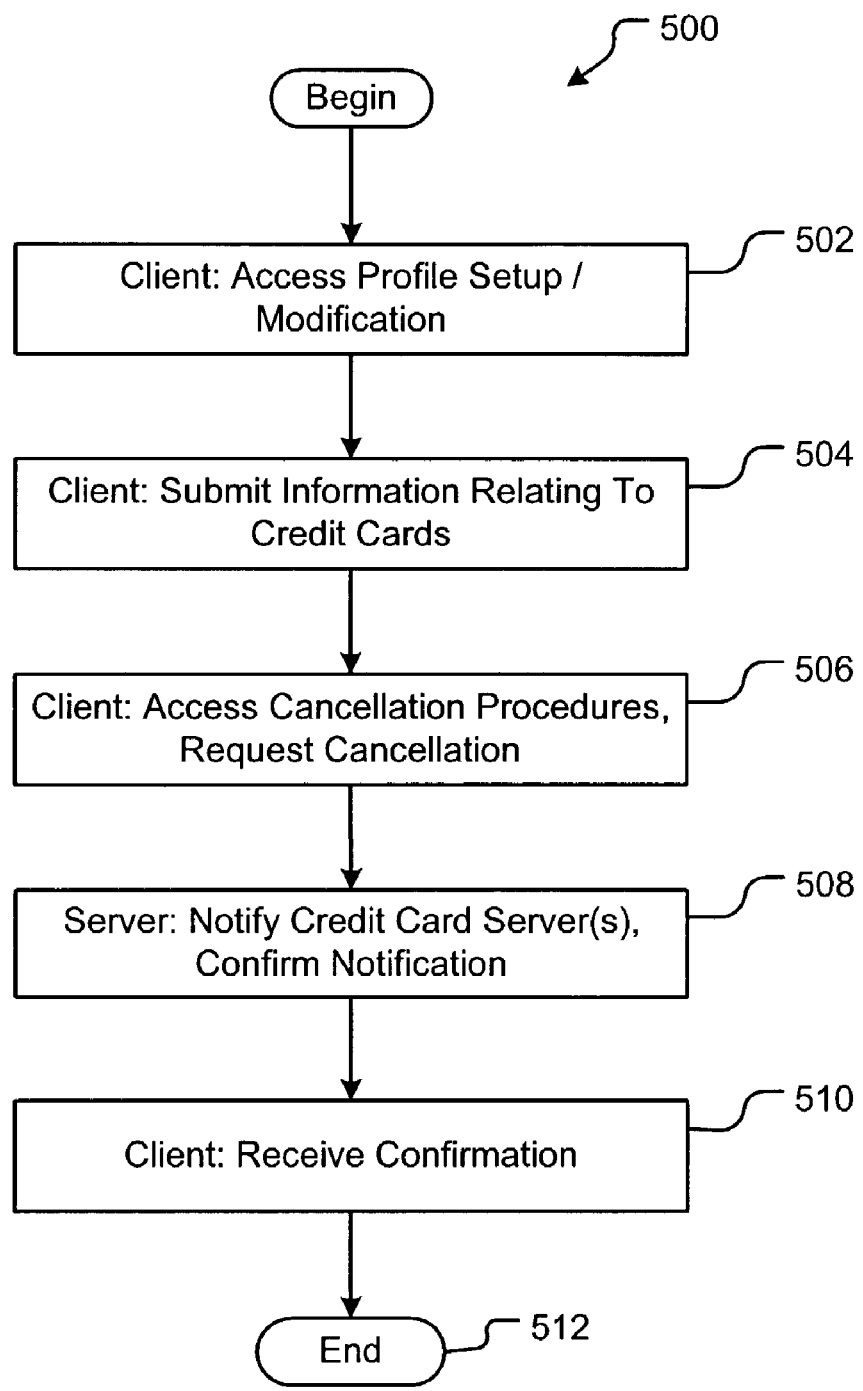
FIG. 5 illustrates a high-level flowchart of functional operations related to the canceling one or more credit cards in accordance with an embodiment of the present invention, including the functional operations of setting up a profile, such as one of the profiles shown in FIG. 4.

FIG. 5 illustrates a high-level flowchart of functional operations related to the canceling one or more credit cards in accordance with an embodiment of the present invention, including the functional operations of setting up a profile, such as one of the profiles shown in FIG. 4. Initially, flow 500 begins with access operation 502. Access operation 502 relates to accessing the proper profile setup page or portion on the server system, such as server 110 shown in FIG. 1. Access operation 502 may involve the use of setup modules, such as modules 310 and 326. In an embodiment, during access operation, the server system receives a request from the client, such as from the client computer system 102 (FIG. 1). The request indicates that the client desires to log onto or gain access to a secure link, such as a secure website. The request may be made from a WAP device or from an HTTP device over the Internet. Alternative embodiments may use other devices, protocols or networks to transfer this request and set up the communication to setup or modify a protocol. In other words, many known methods of communication may be used to transfer this request to the sever computer system.

Upon accessing the profile setup or modification portion of the server, submit operation 504 submits information relating to credit cards. Submit operation typically involves the user directly providing credit card account information, including the person's name on the credit card, the account number, the expiration date, the name of the credit card company and the contact information for the company. Alternative embodiments may require more or less information. In essence, the user must provide enough information to the server system that allows the server system to store identifying information in the profile, where the identifying information allows the server to contact the credit card company and notify that credit card company of a loss. In one embodiment for example, the user may be provided an alias by the credit card company, such that the user need only supply that alias and an associated credit card company to the server. Submission operation 504 further involves the server storing the profile information and associating the information with the particular user, such as through a login name and password account. Preferably, the user may modify the information later.

Once the profile has been stored, access cancellation procedures operation 506 accesses the cancellation procedures on the server, and provides the client the ability to request cancellation of one or more credit cards listed in that client's profile. Access operation 506 may occur any time after the profile has been setup or modified in operation 502 and 504 and may not occur for quite some time. Access operation may even be initiated from a different client device. In an embodiment access operation 506 involves the user requesting a particular URL (uniform resource locator) on the server, such as server 110 (FIG. 1). The URL is a global address of documents and resource on the World Wide Web. As discussed above with respect to access operation 502, the URL may be accessed from a WAP device or from an HTTP device over the Internet. Alternative embodiments may use other devices, protocols or networks to transfer this request and set up the communication between the client and the server to access the cancellation procedures. In one embodiment, the link is secure and the user accesses the procedures using a login name and password. Upon accessing the procedures, the user provides a request to notify one or more companies that one or more credit cards have been lost or stolen.

Following receipt of the request to cancel one or more credit cards, notify operation 508 notifies the one or more credit card companies of the request to cancel the respective credit cards. The notification process relates to the server identifying the information in the proper profile for the user and contacting each credit card company, i.e., the companies identified as issuing one of the lost credit cards and supplying the requisite authorization information, a request to cancel, and the associated account information. Upon notifying the credit card companies, the server receives a confirmation from each company that the request to cancel has been received.

Following notification operation 508, the client receives, at receive operation 510, a confirmation from the server system that the cancellation request has been made. The client may also receive independent confirmation from the credit card company, such as when the account is actually frozen or cancelled. Following receive operation 510, flow 500 ends at end operation 512.

Figure 6:
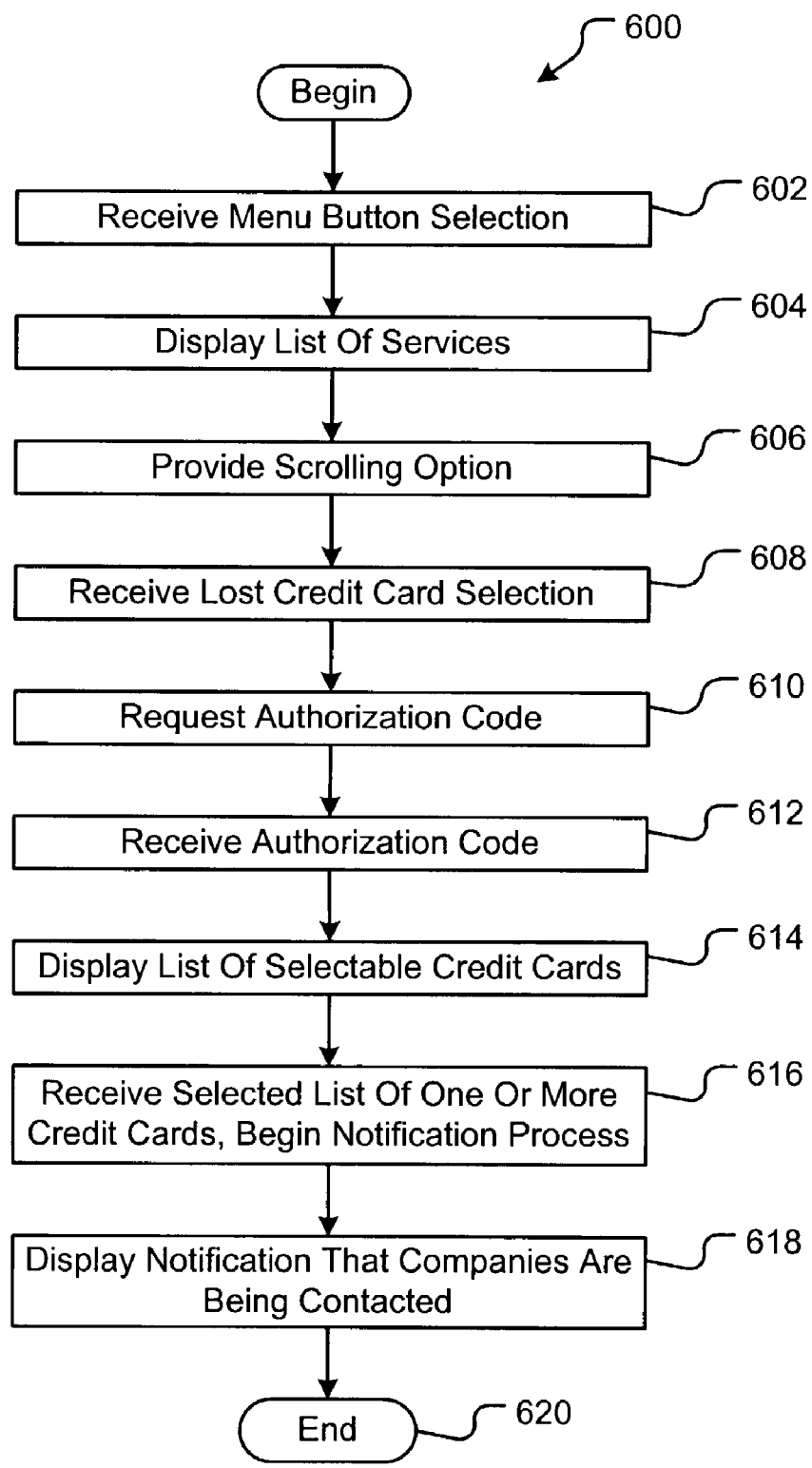
FIG. 6 illustrates a flowchart of user-interface functional operations employed in canceling at least one credit card in accordance with a particular embodiment of the invention.

FIG. 6 illustrates a flowchart of user-interface functional operations employed in canceling at least one credit card in accordance with a particular embodiment of the invention. In one embodiment, the user interface is operable on a WAP device, but other devices may employ similar user-interface functions to provide the transfer of necessary information between the client device, such devices 102, 104, 106 and 108 shown in FIG. 1 and the server, such as server 110 also shown in FIG. 1. Initially, flow 600 begins with receive menu button selection operation 602. Receive menu button selection 602 relates to the client device receiving a signal from the user-interface indicating that the user has selected at least one button requesting connection to the server 110. For instance, the user may have "book marked" the request to connect to the server 110 such that initiating the communication requires only selecting the proper bookmark, e.g., a lost credit card icon or menu option on the user-interface. In other embodiments, receive menu button operation 602 may involve more user actions such as using a browser to locate the proper URL.

Upon accessing the URL, the user-interface displays, at display operation 604, a list of services available to the user. The list may include such options as setup a new profile, modify an existing profile, cancel one or more credit cards from an existing profile and exit. Of course, other services may also be included, such as freeze one or more credit cards, cancel and order new credit cards, etc. Depending on the number of services provided and the size and type of the user-interface display area, a scrolling option may also be provided at operation 606 to allow the user to select one of the services using up and down (or left and right) arrow keys. Such a scrolling option may be commonly used in WAP devices, yet other devices, such as personal computer systems may simply display the list of selectable services without a scrolling option.

According to aspects of the present invention, the user of the client device then selects the lost credit card notification service. Upon user selection of the lost credit card notification service, receive operation 608 receives the selection, which in turn, communicates this selection to the server device. Typically, the next user-interface action relates to displaying a request, at operation 610, for authorization code. The request may come from the server system indicating that in order to continue, the client must provide necessary authorization code, such as a login name and password. Consequently, the server transfers user-interface elements relating to the request for such authorization code. Upon displaying such elements, the user complies by inserting proper authorization values, such as the user's login name and password. Receive operation 612 relates to the client system receiving this information and transferring the same to the server.

Assuming the user is authorized, display operation 614 displays a list of selectable credit cards for cancellation. Display operation 614 receives the information from the server related to the various credit cards associated with the user's profile. Upon receiving the information related to these credit cards, the user interface is able to display the list of each credit card. The user then selects one or more of the credit cards to be canceled. Additionally, the list may also include other selections, such as a "select all credit cards" option to help the user in selecting the necessary credit cards for cancellation and/or an "OK" option to indicate the selection is complete. Upon selecting the credit cards to be cancelled, the user indicates the selection process is complete, such as by selecting the "OK" option.

Receive operation 616 receives the list of one or more credit cards to be canceled and begins the notification process. That is, once the user completes the selection process, the user interface receives the request to submit the selection to the server. The server, in turn, receives the selected list of credit cards and begins notifying the associated credit card companies of the loss. The functional operations related to the server-side actions in canceling the one or more credit cards are discussed below in conjunction with FIG. 7.

Upon receiving the selected list at operation 616, and once the notification process has begun, the user-interface receives and displays a confirmation from the server system that the notification process has begun. In one embodiment, each time a credit card company is notified, a separate notification is displayed. Alternatively, a general confirmation may be displayed, indicating follow-up capabilities, such as phone numbers of the selected credit card companies, etc. Once the confirmation is displayed at operation 618, flow ends at end operation 620.

Figure 7:
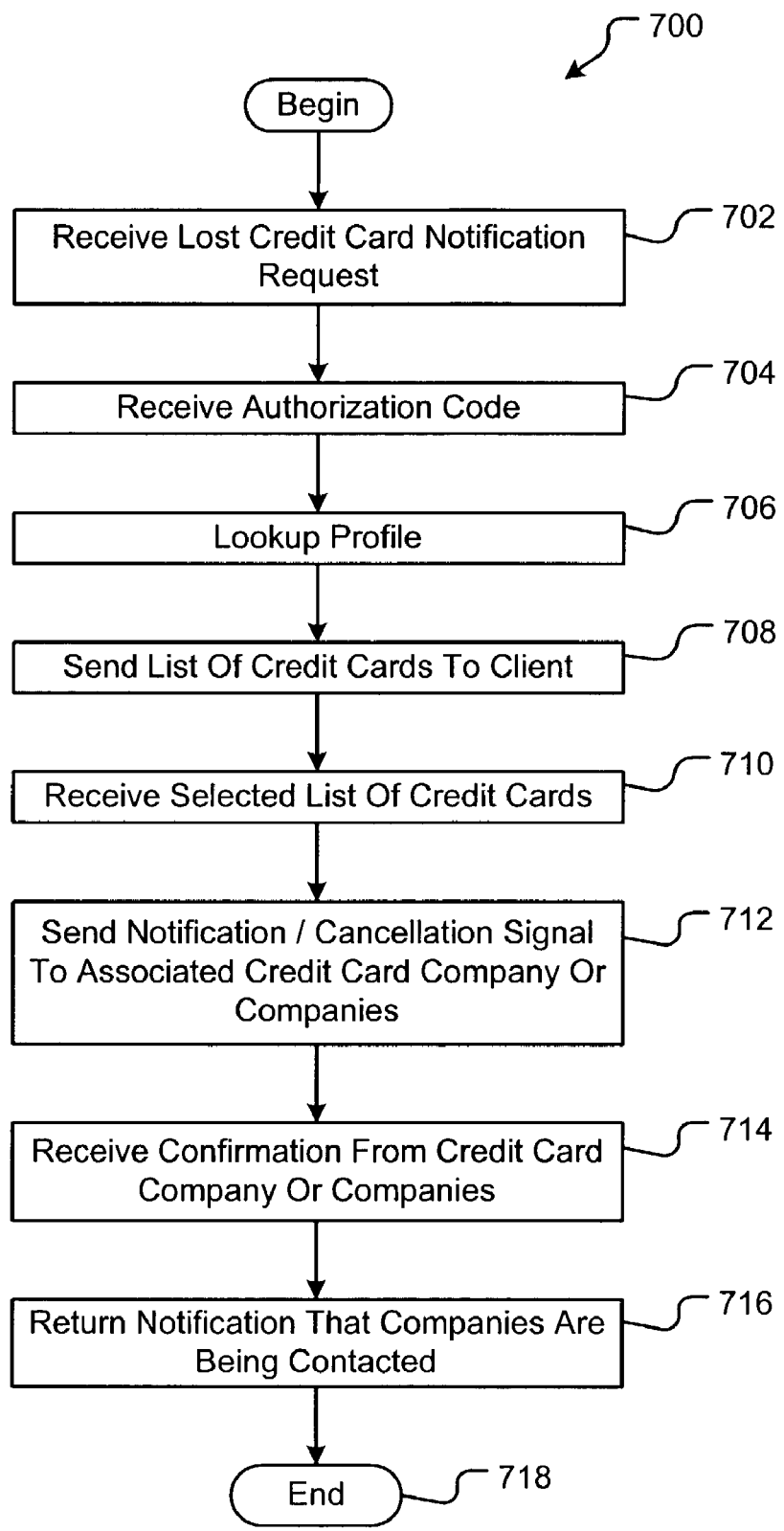
FIG. 7 illustrates a flowchart of functional operations related to server-side operations in processing requests for canceling one or more credit cards in accordance with a particular embodiment of the invention.

FIG. 7 illustrates a flowchart of functional operations related to server-side operations in processing requests for canceling one or more credit cards in accordance with a particular embodiment of the invention. Flow 700 begins with receive operation 702, which receives a lost credit card notification request from a client device. In response, the server may request that the user on the client device provide some authorization before continuing. Thus, the server may send a notice requesting such information. Alternatively, the client may recognize that authorization is required and simply request the information directly.

Upon requesting the authorization, receive operation 704 receives the authorization code. In one embodiment, the authorization code is a login or user name and a password. Other embodiments may implement other authorization codes, but typically, such codes must be entered by the user of the client device and validated by the server computer system. Next, upon validation, lookup operation 706 looks up the profile for the validated user. In one embodiment, the profile is directly associated with the authorization values such that the lookup operation 706 relates to accessing other elements in the profile.

Following lookup operation 706, send operation 708 sends a list of credit cards in the profile to the client device. The client device may then display the list of credit cards for user selections as discussed above with relation to display operation 614. In response to user selection of one or more credit cards, the server receives, at receive operation 710, a list of credit cards to be canceled or frozen.

Once one or more credit cards have been selected and such a selection is received at the server, send operation 712 begins the notification process. In general, send operation 712 sends a notification signals to credit card companies to carry out the cancellation process. More specifically, send operation 712 may involve the accessing of credit card contact information, initiating contact between the server and the credit card server and requesting a secure link between the two. The operation may further provide authorization code to the credit card server. Send operation 712 sends the account information related to the specific user account to enable the credit card server to accurately locate and freeze the account. Send operation 712 may further send an actual cancellation request associated with the account such that the credit card server recognizes that the account should be cancelled as soon as possible.

Importantly, send operation 712, in one embodiment, relates to automatically sending multiple notifications to more than one credit card server. That is, as long as the user selects more than one credit card to be cancelled, and different companies issued at least two of the credit cards, then the send operation 712 will send notifications to two or more separate credit card servers. In an embodiment, send operation 712 processes each of the different notifications in order, one after another. In another embodiment, the server system is capable of notifying more than one company at a time and thus two or more companies may be notified, via send operation 712, substantially simultaneously by different communication links.

Upon notifying a credit card company of a loss, the server may receive, at receive operation 714, a confirmation from the credit card company (or companies) that the request to freeze or cancel has been received and/or is being processed. Such a confirmation may then be returned, at return operation 716 to the client such that the client knows that the credit card company has received the notification. Upon returning the confirmation to the client, flow 700 ends at end operation 718.

Figure 8:
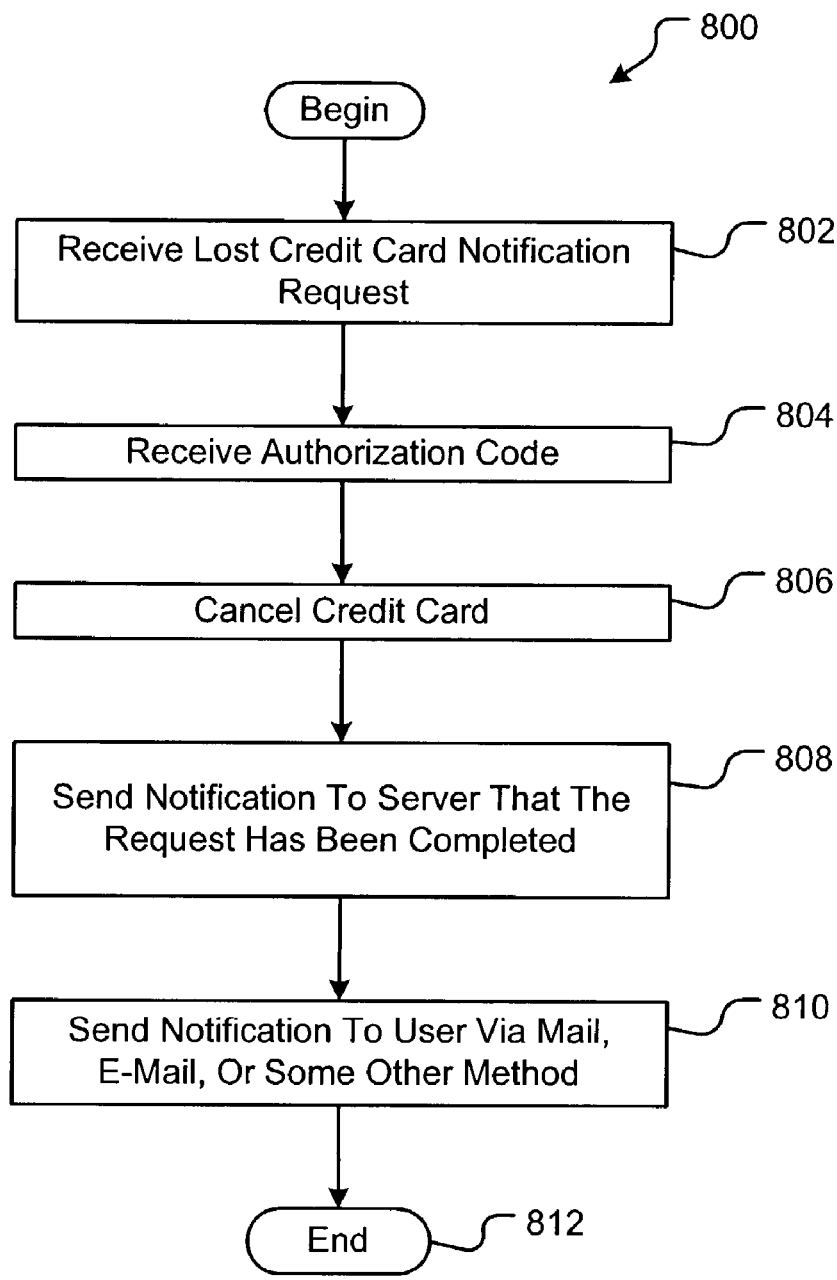
FIG. 8 illustrates a flowchart of functional operations related to a credit-card server in processing requests for canceling one or more credit cards in accordance with a particular embodiment of the invention.

FIG. 8 illustrates a flowchart of functional operations related to a credit-card server, such as one of the servers 116, 118 or 120 shown in FIG. 1, in processing requests for canceling one or more credit cards in accordance with a particular embodiment of the invention. Initially, flow 800 begins with receive operation 802, wherein the credit card server receives a request from another computer system, such as the server 110 shown in FIG. 1. The request relates to a request to establish a link between the computer systems such that a lost credit card notification may be made.

Following receipt of the request to notify, receive operation 804 receives an authorization code. In an embodiment, the authorization or verification information is transmitted to the credit card server along with the request to notify. However, in other embodiments, the credit card server may request authorization upon receiving a request to notify. In either case, the server system, such as server 110 (FIG. 1), transmits some form of authorization so the credit card server system can verify the identity of the transmitting server (e.g., server 110, FIG. 1). Consequently, upon receiving authorization code 804, the credit card server may implement one or more verification actions (not shown) to verify the authorization code using predetermined or previously stored lookup tables of values.

Once verified, the credit card server freezes or cancels the credit card, at operation 806. In one embodiment, the notification request includes the credit card account information such that the credit card server may freeze or cancel a credit card as soon as the request has been authorized. In other embodiments, once the requesting party has been authorized, the credit card server then requests credit card account information. In such a case, the server, such as server 110 provides the credit card account information. The credit card account information may include the owner's name, the credit card account number, an expiration date and/or an alias. Using this information, the credit card server may automatically enter a hold or a freeze on the account to prevent future purchases against the account until unfrozen. Additionally, the credit card server may actually cancel the credit card outright so that a new account must be created in order for the owner to charge any more purchases.

Once the credit card has been frozen or canceled, send operation 808 sends a notification to the server, such as server 110 that the lost credit card notification has been received. Additionally, send operation 808 may also indicate that the credit card account is being processed or, in the case where the account has been frozen or canceled, the status of that account. Thus, the server may forward any status information on to the client device.

Additionally, the credit card server may send a notification, at operation 810, to the owner of the credit card via other means, such as through stored contact information. The stored contact information may relate to a phone number, an email account, or a post office address. Thus, the owner of the account being frozen or canceled gets relatively direct notice from the credit card company of the account activity.

Using the above described system and/or method, a user is able set up a profile listing credit card information for one, some or all of their credit cards. The profile is stored independently of the user's credit card, i.e., such as on a server. Consequently, if and when the user's credit cards are lost, stolen or otherwise missing, the user need only contact the server and notify the server that some or all of the credit cards are missing. The server, in turn, contacts some or all of the credit card companies that issued the missing credit cards. The server maintains the profile with identification and contact information such that this process is carried out relatively automatically, i.e., with no further information needed from the user. The server and/or the credit card company then notifies the user that the one or more credit cards have been cancelled or otherwise frozen such that no fraudulent purchases may be made against the accounts.

Those skilled in the art may appreciate that the other alternative embodiments to the above-described embodiments may be created. For example, the above system and method is not limited to lost credit cards, i.e., a user may use the service provided through the server to cancel credit cards that have not been lost, such as those the user does not want to use anymore. The above system and method is not limited to credit cards, i.e., other identification or membership accounts may be canceled in this manner. For instance, driver's licenses, health club memberships airline or frequent flier memberships, bar associations, retail company accounts, and hotel or rewards memberships, among others may all be profiled according to the above system and method. Furthermore, there are many different potential client devices and potential connection methods between the client devices and the server. Consequently, it will be clear that the present invention is well adapted to attain the ends and advantages mentioned as well as those inherent therein. While a presently preferred embodiment has been described for purposes of this disclosure, various changes and modifications may be made which are well within the scope of the invention. Numerous other changes may be made which will readily suggest themselves to those skilled in the art and which are encompassed in the spirit of the invention disclosed and as defined in the appended claims.

What is claimed is:

1. A method, comprising:

storing a profile on a computer system, the profile comprising account information for a credit card;

communicating with a credit card company to receive an alias instead of an account number, the alias comprising a code recognizable by the credit card company as related to the account number for the credit card;

storing the alias in the profile and associating the alias to the credit card;

receiving a request for cancellation sent from a client system associated with an authorization code;

retrieving from the profile a listing of credit cards associated with the authorization code;

sending the listing of credit cards to the client system;

displaying the listing of credit cards in a user interface at the client system;

receiving in the user interface a selection of credit cards to cancel;

sending the selection of credit cards to cancel to the computer system;

querying the profile for each credit card in the selection of credit cards to cancel;

retrieving from the profile the alias and a uniform resource locator associated with each credit card in the selection of credit cards to cancel; and automatically sending the alias to the uniform resource locator of the credit card company to cancel the account number for the credit card.

2. The method as defined in claim 1 further comprising canceling the credit card.

3. The method as defined in claim 2, further comprising notifying a credit card owner of cancellation of the credit card.

4. The method as defined in claim 3, wherein the credit card owner is notified by email.

5. The method as defined in claim 3, wherein the credit card owner is notified by phone.

6. The method as defined in claim 3, wherein the credit card owner is notified by mail.

7. The method as defined in claim 1, further comprising freezing use of the credit card.

8. The method as defined in claim 1, wherein the authorization code comprises a user name.

9. The method as defined in claim 1, wherein the authorization code comprises a password.

10. The method as defined in claim 9, wherein the profile further comprises contact information for the credit card company.

11. The method as defined in claim 1, further comprising:

receiving the identification value from a credit card owner;

creating the profile and sending the profile to the computing system.

12. The method as defined in claim 1, further comprising processing new account information to create a new account for the credit card owner.

13. A computer readable medium storing computer-executable instructions for performing a method, the method comprising:

storing a profile in memory for a credit card;

communicating with a credit card company to receive an alias instead of an account number for the credit card, the alias comprising a code recognizable by the credit card company as related to the account number for the credit card;

storing the alias in the profile and associating the alias to the credit card;

receiving a request for cancellation sent from a client system associated with an authorization code;

retrieving from the profile a listing of credit cards associated with the authorization code;

sending the listing of credit cards to the client system;

displaying the listing of credit cards in a user interface at the client system;

receiving in the user interface a selection of credit cards to cancel;

sending the selection of credit cards to cancel to the computer system;

querying the profile for each credit card in the selection of credit cards to cancel;

retrieving from the profile the alias and a uniform resource locator associated with each credit card in the selection of credit cards to cancel; and automatically sending the alias to the uniform resource locator of the credit card company to cancel the account number for the credit card.

14. A system, comprising:

a processor;

memory; and code stored in the memory that causes the processor to perform a method, the method comprising:

storing a profile comprising account information for a credit card;

communicating with a credit card company to receive an alias instead of an account number, the alias comprising a code recognizable by the credit card company as related to the account number for the credit card;

storing the alias in the profile and associating the alias to the credit card;

receiving a request for cancellation sent from a client system associated with an authorization code;

retrieving from the profile a listing of credit cards associated with the authorization code;

sending the listing of credit cards to the client system;

displaying the listing of credit cards in a user interface at the client system;

receiving in the user interface a selection of credit cards to cancel;

sending the selection of credit cards to cancel to the computer system;

querying the profile for each credit card in the selection of credit cards to cancel;

retrieving from the profile the alias and a uniform resource locator associated with each credit card in the selection of credit cards to cancel; and automatically sending the alias to the uniform resource locator of the credit card company to cancel the account number for the credit card.

15. The system according to claim 14, wherein the code further causes the processor to receive confirmation of cancellation.

* * * * *